United States Patent
Yang

(10) Patent No.: US 9,652,095 B2
(45) Date of Patent: May 16, 2017

(54) PIXEL CIRCUIT, METHOD FOR DRIVING THE SAME, ORGANIC LIGHT-EMITTING DIODE DISPLAY PANEL, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Shengji Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 88 days.

(21) Appl. No.: 14/443,301

(22) PCT Filed: Sep. 29, 2014

(86) PCT No.: PCT/CN2014/087789
§ 371 (c)(1),
(2) Date: May 15, 2015

(87) PCT Pub. No.: WO2015/180344
PCT Pub. Date: Dec. 3, 2015

(65) Prior Publication Data
US 2016/0274692 A1    Sep. 22, 2016

(30) Foreign Application Priority Data
May 29, 2014    (CN) .......................... 2014 1 0234659

(51) Int. Cl.
*G06F 3/044*    (2006.01)
*G09G 3/3266*    (2016.01)
(Continued)

(52) U.S. Cl.
CPC ............ *G06F 3/044* (2013.01); *G06F 3/0412* (2013.01); *G09G 3/3233* (2013.01);
(Continued)

(58) Field of Classification Search
CPC ..... G06F 3/044; G09G 3/3225; G09G 3/3233
See application file for complete search history.

(56) References Cited

U.S. PATENT DOCUMENTS

| 2010/0097352 A1 | 4/2010 | Ahn et al. |
| 2011/0063252 A1 | 3/2011 | Chang et al. |

(Continued)

FOREIGN PATENT DOCUMENTS

| CA | 2824621 A1 | 2/2014 |
| CN | 101957695 A | 1/2011 |

(Continued)

OTHER PUBLICATIONS

Written Opinion of the International Searching Authority for international application No. PCT/CN2014/087789.
(Continued)

*Primary Examiner* — Gerald Johnson
(74) *Attorney, Agent, or Firm* — Harness, Dickey & Pierce, P.L.C.

(57) ABSTRACT

The present disclosure provides a pixel circuit, its driving method, an OLED display panel and a display device. The pixel circuit includes: a display driving module configured to, within a time period and under the control of a first scanning signal from a first scanning line, a second scanning signal a the second scanning line and a control signal from a control line, compensate for a threshold voltage of a driving transistor with a data signal from a data line and a second signal from a second signal source, so that a light-emitting driving signal for the OLED is irrelevant to the threshold voltage of the driving transistor at a third stage of
(Continued)

the time period; and a capacitive touch detection module configured to, within the time period and under the control of the first scanning signal and the control signal, detect a touch signal from a touch screen.

18 Claims, 8 Drawing Sheets

(51) Int. Cl.
  *G09G 3/3275* (2016.01)
  *G06F 3/041* (2006.01)
  *G09G 3/3233* (2016.01)

(52) U.S. Cl.
  CPC ......... *G09G 3/3266* (2013.01); *G09G 3/3275* (2013.01); *G06F 2203/04111* (2013.01); *G09G 2300/0819* (2013.01); *G09G 2300/0852* (2013.01); *G09G 2300/0861* (2013.01); *G09G 2320/0626* (2013.01)

(56) References Cited

U.S. PATENT DOCUMENTS

| | | |
|---|---|---|
| 2011/0102403 A1 | 5/2011 | Kim |
| 2013/0082910 A1* | 4/2013 | Lee ................... G09G 3/3208 345/76 |
| 2014/0055500 A1 | 2/2014 | Lai |
| 2014/0198067 A1 | 7/2014 | Jeon |
| 2014/0225938 A1 | 8/2014 | Soni et al. |
| 2015/0193045 A1* | 7/2015 | Zhou ................... G09G 3/3233 345/174 |
| 2015/0294626 A1* | 10/2015 | Bi ....................... G09G 3/3233 345/211 |
| 2016/0246409 A1* | 8/2016 | Yang ..................... G09G 3/32 |

FOREIGN PATENT DOCUMENTS

| | | |
|---|---|---|
| CN | 102682705 A | 9/2012 |
| CN | 103135846 A | 6/2013 |
| CN | 103137067 A | 6/2013 |
| CN | 103208255 A | 7/2013 |
| CN | 103246396 A | 8/2013 |
| CN | 103295525 A | 9/2013 |
| CN | 203179480 U | 9/2013 |
| CN | 203242307 U | 10/2013 |
| CN | 103456267 A | 12/2013 |
| CN | 203503280 U | 3/2014 |
| CN | 104021756 A | 9/2014 |
| CN | 203858846 U | 10/2014 |
| JP | 2006119180 A | 5/2006 |
| JP | 2006285117 A | 10/2006 |
| JP | 2012123399 A | 6/2012 |
| WO | WO-2011028451 A1 | 3/2011 |

OTHER PUBLICATIONS

First Office Action regarding Chinese Application No. 2014103027114 dated Sep. 30, 2015. Translation provided by Dragon Intellectual Property Law Firm.
Written Opinion of the International Search Authority for International Application No. PCT/CN2014/085104. Translation provided by Dragon Intellectual Property Law Firm, Aug. 25, 2014.

* cited by examiner

PIXEL CIRCUIT, METHOD FOR DRIVING THE SAME, ORGANIC LIGHT-EMITTING DIODE DISPLAY PANEL, AND DISPLAY DEVICE

CROSS-REFERENCE TO RELATED APPLICATION APPLICATIONS

The present application is the U.S. national phase of PCT Application No. PCT/CN2014/087789 filed on Sep. 29, 2014, which claims a priority of the Chinese patent application No. 201410234659.3 filed on May 29, 2014. The disclosures of both of which are incorporated herein by reference in theft entirety.

TECHNICAL FIELD

The present disclosure relates to the field of display technology, in particular to a pixel circuit, a method for driving the same, an organic light-emitting diode (OLED) display panel and a display device.

BACKGROUND

An organic light-emitting diode display (for example AMOLED) is one of the research hotpots for a current flat-panel display device. As compared with a liquid crystal display device, the OLED has such advantages as low power consumption, low production cost, autoluminescence, wide viewing angle and rapid response. Recently, the OLED has begun to replace a traditional liquid crystal display (LCD) in such fields as mobile phones, PDAs and digital cameras. The design of a pixel driving circuit is a core technique of the AMOLED display device, and thus it is of important research significance.

Different from a TFT-LCD which controls the brightness with a stable voltage, the OLED is driven to emit light with a stable current. Due to a manufacturing process and the aging of elements, a threshold voltage ($V_{th}$) of a driving TFT for each pixel point will be drifted, which results in a change of the current passing through the OLED for each pixel point along with a change of the threshold voltage. As a result, the display brightness is uneven, and thereby a display effect of an entire image will be adversely affected.

Currently, an in-cell touch technology has been applied to the LCD, and it commonly includes a capacitive in-cell touch technology. However, as the most difficult problem to be solved in the capacitive in-cell touch technology, there is signal interference, i.e., there is a considerable parasitic capacitance between a touch electrode and an electrode desired for the operation of the LCD. As a result, it is very difficult to prevent display characteristics of the LCD itself from being adversely affected while ensuring that a touch signal is collected successfully.

Hence, a combination of the capacitive in-cell touch technology with the AMOLED will be a future trend of the display technology.

SUMMARY

An object of the present disclosure is to provide a pixel circuit, its driving method, an OLED display panel and a display device, so as to eliminate an effect caused by a threshold voltage of a driving transistor on a light-emitting driving signal, thereby to improve the brightness evenness of the OLED display panel as well as a display effect of the display device. In addition, it is also able to detect a touch while achieving the display driving, thereby to further achieve integration of the display driving and the touch detection in a more effective manner.

In one aspect, the present disclosure provides in one embodiment a pixel circuit, including a first storage capacitor, a driving transistor and an OLED. A gate electrode of the driving transistor is connected to a second end of the first storage capacitor. The pixel circuit further includes:

a display driving module, connected to a first scanning line, a second scanning line, a control line, a data line, a first signal source and a second signal source, respectively, and configured to, within a time period and under the control of a first scanning signal from the first scanning line, a second scanning signal from the second scanning line and a control signal from the control line, compensate for a threshold voltage of the driving transistor with a data signal from the data line and a second signal from the second signal source, so that a light-emitting driving signal for the OLED is irrelevant to the threshold voltage of the driving transistor at a third stage of the time period; and a capacitive touch detection module, connected to the first scanning line, the control line, the data line, a third signal source and a signal reading line, respectively, and configured to, within the time period and under the control of the first scanning signal and the control signal, detect a touch signal from a touch screen.

Alternatively, the display driving module includes:

a resetting unit, connected to the first signal source, the control line and a first end of the first storage capacitor, respectively, and configured to, at a first stage of the time period, reset a potential at the first end of the first storage capacitor as a potential of a first signal;

a first charging unit, connected to the first scanning line, the data line, the driving transistor and the second end of the first storage capacitor, respectively, and configured to, at a second stage of the time period, charge the first storage capacitor so that the second end of the first storage capacitor is at a potential equal to a difference between a potential of a data signal and the threshold voltage of the driving transistor; and a compensation driving unit, connected to the second scanning line, the data line, the second signal source, the first end of the storage capacitor and the driving transistor, respectively, and configured to, the third stage of the time period, control the first end of the first storage capacitor to be at the potential of the data signal, so as to enable the potential at the second end of the first storage capacitor to jump to a potential equal to a difference between twice the potential of the data signal and the threshold voltage of the driving transistor, thereby to determine the light-emitting driving signal for the OLED on the basis of the second signal and the data signal, and to drive the OLED to emit light using the light-emitting driving signal.

Alternatively, the resetting unit includes a first thin film transistor, a source electrode of which is connected to the first signal source, a gate electrode of which is connected to the control line, and a drain electrode of which is connected to the first end of the first storage capacitor.

Alternatively, the first charging unit includes:

a second thin film transistor, a source electrode of which is connected to the data line, a gate electrode of which is connected to the first scanning line, and a drain electrode of which is connected to a source electrode of the driving transistor; and a third thin film transistor, a source electrode of which is connected to a drain electrode of the driving transistor, a gate electrode of which is connected to the first scanning line, and a drain electrode of which is connected to the second end of the first storage capacitor.

Alternatively, the compensation driving unit includes:

a fourth thin film transistor, a source electrode of which is connected to the second signal source, a gate electrode of which is connected to the second scanning line, and a drain electrode of which is connected to the source electrode of the driving transistor;

a fifth thin film transistor, a source electrode of which is connected to the drain electrode of the driving transistor, a gate electrode of which is connected to the second scanning line, and a drain electrode of which is connected to an anode of the OLED; and a sixth thin film transistor, a source electrode of which is connected to the data line, a gate electrode of which is connected to the second scanning line, and a drain electrode of which is connected to the first end of the first storage capacitor.

Alternatively, the capacitive touch detection module includes a second storage capacitor, a second charging unit and a transmitting unit. The second charging unit is connected to the data line, the control line and a second end of the second storage capacitor, respectively, and configured to, at the first stage of the time period, charge the second storage capacitor so that a potential at the second end of the second storage capacitor is equal to the potential of the data signal. The transmitting unit is connected to the third signal source, the second storage capacitor, the first scanning line and the signal reading line, respectively, and configured to, at the second stage of the time period, transmit a third signal from the third signal source to the signal reading line when the touch screen is in a touch state, so as to enable a processor connected to the signal reading line to determine information about a position where the touch is made.

Alternatively, the second charging unit includes a charging transistor, a source electrode of which is connected to the data line, a gate electrode of which is connected to the control line, and a drain electrode of which is connected to the second end of the second storage capacitor.

Alternatively, the transmitting unit includes an amplifying transistor and a switching transistor. A source electrode of the amplifying transistor is connected to a first end of the second storage capacitor and the third signal source, respectively, a gate electrode thereof is connected to the second end of the second storage capacitor, and a drain electrode thereof is connected to a source electrode of the switching transistor. A gate electrode of the switching transistor is connected to the first scanning line, and a drain electrode thereof is connected to the signal reading line.

Alternatively, the transistors are P-type transistors, the first signal is a low level signal or a zero potential signal, the second signal is a high level signal, and the third signal is a coupling pulse signal.

In another aspect, the present disclosure provides in one embodiment a pixel driving circuit for use in the above-mentioned pixel circuit, including steps of:

within a time period, under the control of a first scanning signal from a first scanning line, a second scanning signal from a second scanning line and a control signal from a control line, compensating for a threshold voltage of a driving transistor with a data signal from a data line and a second signal from a second signal source so that a light-emitting driving signal for an OLED is irrelevant to the threshold voltage of the driving transistor at a third stage of the time period; and within the time period, detecting a touch signal from a touch screen under the control of the first scanning signal and the control signal.

Alternatively, the step of within a time period, under the control of the first scanning signal from the first scanning line, the second scanning signal from the second scanning line and the control signal from the control line, compensating for the threshold voltage of the driving transistor with the data signal from the data line and the second signal from the second signal source so that the light-emitting driving signal for the OLED is irrelevant to the threshold voltage of the driving transistor at the third stage of the time period may include:

at a first stage of the time period, resetting, by a resetting unit, a potential at a first end of a first storage capacitor as a potential of a first signal;

at a second stage of the time period, charging, by a first charging unit, the first storage capacitor so that a second end of the first storage capacitor is at a potential equal to a difference between a potential of a data signal and the threshold voltage of the driving transistor; and at the third stage of the time period, controlling, by a compensation driving unit, the first end of the first storage capacitor to be at the potential of the data signal, so as to enable the potential at the second end of the first storage capacitor to jump to a potential equal to a difference between twice the potential of the data signal and the threshold voltage of the driving transistor, thereby to determine the light-emitting driving signal for the OLED on the basis of the second signal and the data signal, and to drive the OLED to emit light using the light-emitting driving signal.

Alternatively, the step of within the time period, detecting a touch signal from a touch screen under the control of the first scanning signal and the control signal may include:

at the first stage of the time period, charging, by a second charging unit, a second storage capacitor so that a second end of a second storage capacitor is at the potential of the data signal; and at the second stage of the time period, transmitting, by a transmitting unit, a third signal from a third signal source to a signal reading line when a touch screen is in a touch state, so as to enable a processor connected to the signal reading line to determine information about a position where a touch is made.

Alternatively, at the first stage, the control signal and the third signal are both low level signals, and the first scanning signal, the second scanning signal and the data signal are high level signals. At the second stage, the first scanning signal is a low level signal, and the control signal, the second scanning signal, the third signal and the data signal are high level signals. At the third stage, the second scanning signal, the third signal and the data signal are low level signals, and the control signal and the first scanning signal are both high level signals.

In yet another aspect, the present disclosure provides in one embodiment an OLED display panel including the above-mentioned pixel circuit.

In still yet another aspect, the present disclosure provides in one embodiment a display device including the above-mentioned OLED display panel.

According to the pixel circuit, its driving method, the OLED display panel and the OLED display device in the embodiments of the present disclosure, the pixel circuit includes the display driving module which is connected to the first scanning line, the second scanning line, the control line, the data line, the first signal source and the second signal source, respectively, and configured to, within the time period and under the control of the first scanning signal from the first scanning line, the second scanning signal from the second scanning line and the control signal from the control line, compensate for the threshold voltage of the driving transistor with the data signal from the data line and the second signal from the second signal source, so that the light-emitting driving signal for the OLED is irrelevant to the threshold voltage of the driving transistor at the third stage of the time period; and the capacitive touch detection module which is connected to the first scanning line, the control line, the data line, the third signal source and the signal reading line, respectively, and configured to, within the time period and under the control of the first scanning signal and the control signal, detect the touch signal from the touch screen. As a result, it is able to eliminate an effect caused by the threshold voltage of the driving transistor on the light-emitting driving signal, thereby to improve the brightness evenness of the OLED display panel as well as a display effect of the display device. In addition, it is also able to detect a touch while achieving the display driving, thereby to further achieve integration of the display driving and the touch detection in a more effective manner.

DETAILED DESCRIPTION

Figure 1:
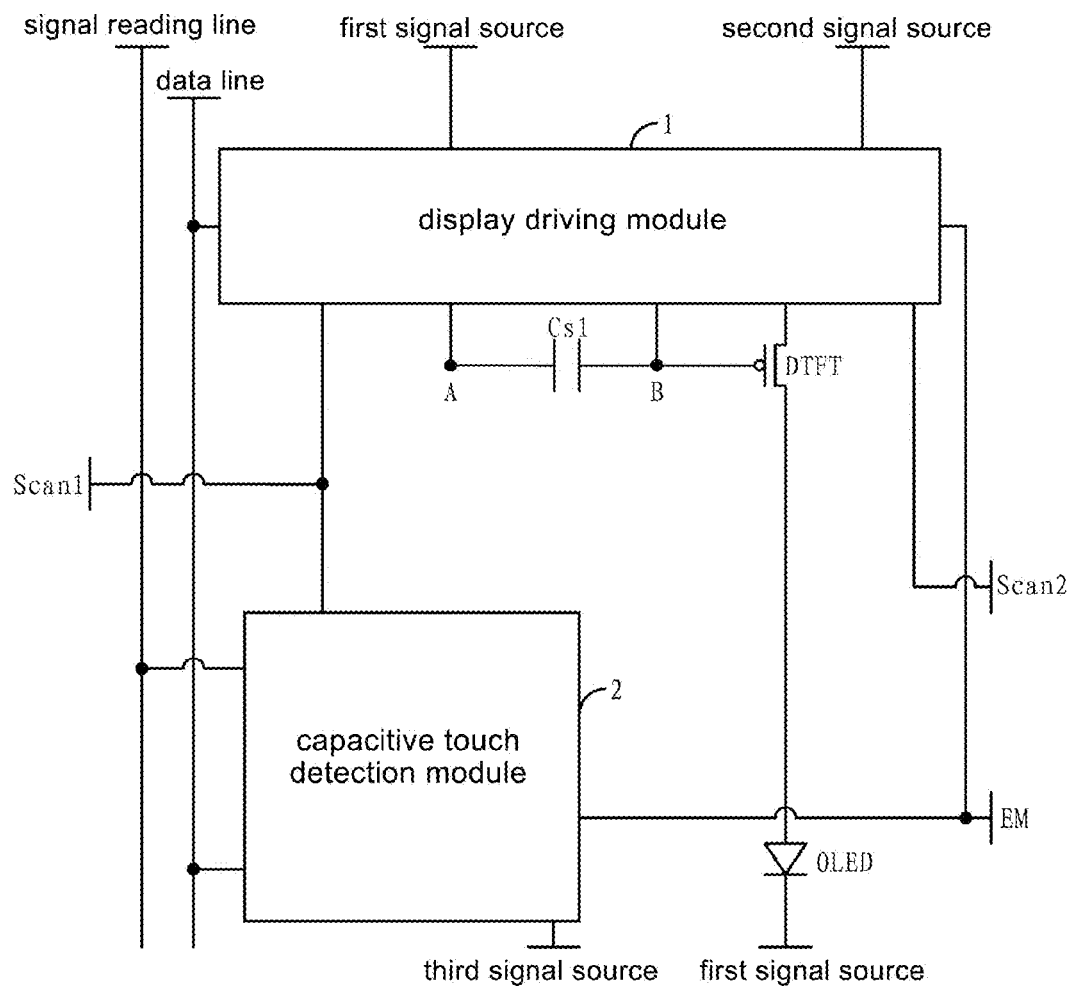
FIG. 1 is a schematic view showing a pixel circuit according to one embodiment of the present disclosure.

In order to make the objects, the technical solutions and the advantages of the present disclosure more apparent, the present disclosure will be described hereinafter in conjunction with the drawings and embodiments in a clear and complete manner. Obviously, the following embodiments merely relate to a part of, rather than all of, the embodiments of the present disclosure. Based on these embodiments, a person skilled in the art may obtain the other embodiments without any creative effort, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection.

The present disclosure provides in one embodiment a pixel circuit. As show in FIG. 1, the pixel circuit includes a first storage capacitor Cs1, a driving transistor DTFT and an OLED. A gate electrode of the driving transistor DTFT is connected to a second end of the first storage capacitor Cs1 (i.e., node B).

The pixel circuit may further include:

a display driving module 1, connected to a first scanning line Scan1, a second scanning line Scan2, a control line EM, a data line, a first signal source and a second signal source, respectively, and configured to, within a time period and under the control of a first scanning signal $V_{Scan1}$ from the first scanning line Scan1, a second scanning signal $V_{Scan2}$ from the second scanning line Scan2 and a control signal $V_{EM}$ from the control line EM, compensate for a threshold voltage $V_{th}$ of the driving transistor DTFT with a data signal $V_{data}$ from the data line and a second signal $V_{dd}$ from the second signal source, so that a light-emitting driving signal for the OLED is irrelevant to the threshold voltage $V_{th}$ of the driving transistor DTFT at a third stage of the time period; and a capacitive touch detection module 2, connected to the first scanning line Scan1, the control line EM, the data line, a third signal source and a signal reading line (Read Line), respectively, and configured to, within the time period and under the control of the first scanning signal $V_{Scan1}$ and the control signal $V_{EM}$, detect a touch signal from a touch screen.

According to the pixel circuit in the embodiment of the present disclosure, it is able to eliminate an effect caused by the threshold voltage of the driving transistor on the light-emitting driving signal, thereby to improve the brightness evenness of an OLED display panel as well as a display effect of the display device. In addition, it is also able to detect a touch while achieving the display driving, thereby to further achieve integration of the display driving and the touch detection in a more effective manner.

In one embodiment of the present disclosure, as shown in FIG. 1, a cathode of the OLED may be connected to the first signal source.

In this embodiment, the first signal source is configured to input a first signal which may be a low level signal or a zero potential signal. In other words, the first signal source may be a low level signal generating element, or connected to a transmission line for transmitting a low level signal, or grounded.

In addition, in this embodiment, the second signal $V_{dd}$ may be a high level signal. In other words, the second signal source may be a high level signal generating element, or connected to a transmission line for transmitting a high level signal.

Figure 2:
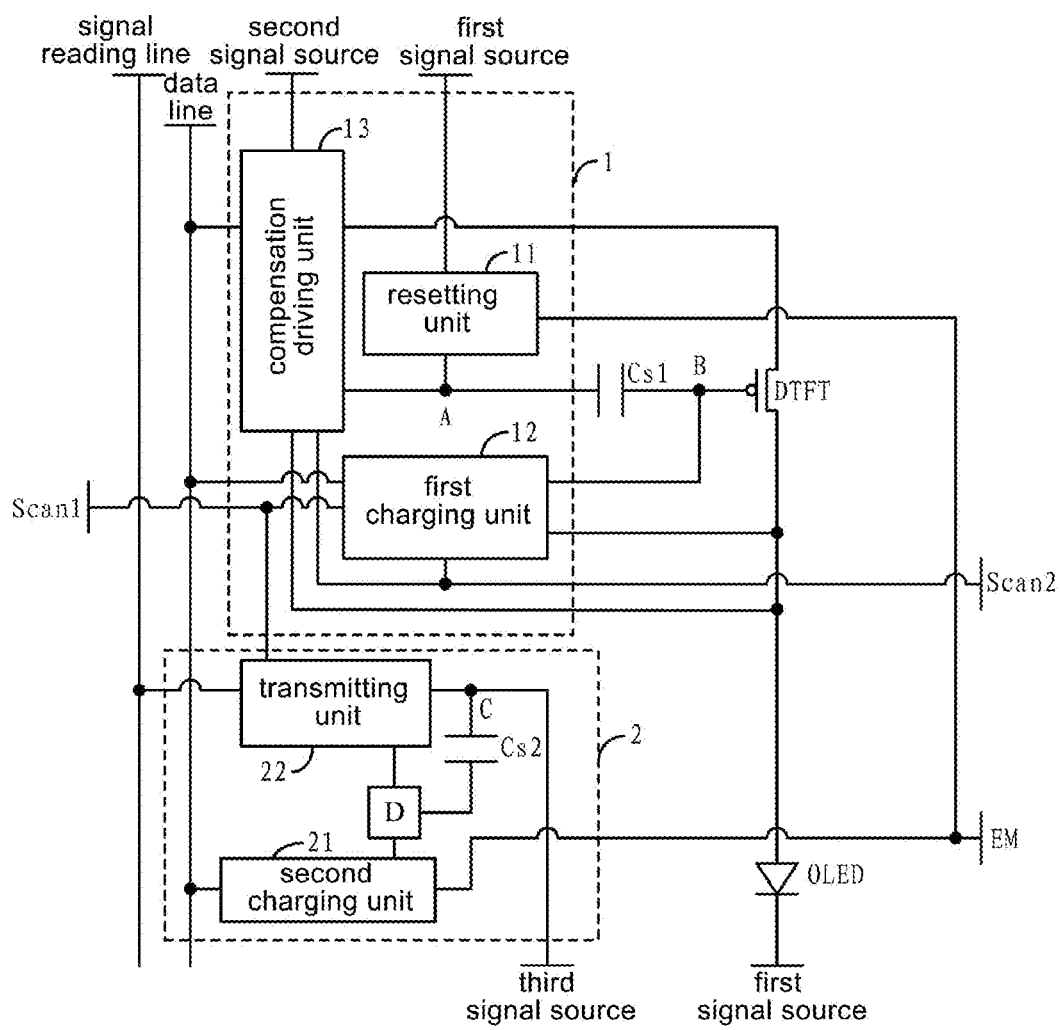
FIG. 2 is a schematic view showing the pixel circuit according to another embodiment of the present disclosure.

In one embodiment, as shown in FIG. 2, the display driving module 1 may include:

a resetting unit 11, connected to the first signal source, the control line EM and a first end (i.e., node A) of the first storage capacitor Cs1, respectively, and configured to, at a first stage of the time period, reset a potential at the first end of the first storage capacitor Cs1 as a potential of the first signal;

a first charging unit 12, connected to the first scanning line Scan1, the data line, the driving transistor DTFT and the second end (i.e., the node B) of the first storage capacitor Cs1, respectively, and configured to, at a second stage of the time period, charge the first storage capacitor Cs1 so that a potential at the second end of the first storage capacitor Cs1 is equal to a difference $V_{B2}$ between a potential of the data signal $V_{data}$ and the threshold voltage $V_{th}$ of the driving transistor DTFT (i.e., $V_{B2}=V_{data}-V_{th}$); and a compensation driving unit 13, connected to the second scanning line Scan2, the data line, the second signal source, the first end of the storage capacitor Cs1 and the driving transistor DTFT, respectively, and configured to, at the third stage of the time period, control the first end of the first storage capacitor Cs1 to be at the potential of the data signal $V_{data}$, so as to enable the potential at the second end of the first storage capacitor Cs1 to jump to a potential equal to a difference $V_{B3}$ between twice the potential of the data signal $V_{data}$ and the threshold voltage $V_{th}$ of the driving transistor DTFT (i.e., $V_{B3}=2V_{data}-V_{th}$), thereby to determine a light-emitting driving signal $I_{OLED}$ for the OLED on the basis of the second signal $V_{dd}$ and the data signal $V_{data}$, and to drive the OLED to emit light using the light-emitting driving signal $I_{OLED}$.

The potential at the second end of the first storage capacitor Cs1 is just a gate potential of the driving transistor DTFT, and when the second signal $V_{dd}$ is applied to the source electrode of the driving transistor DTFT at the third stage, the following equation will be obtained according to a saturation current formula of the driving transistor DTFT:

$$I_{OLED} = K(V_{GS} - V_{th})^2$$
$$= K[V_{dd} - (2V_{data} - V_{th}) - V_{th}]^2$$
$$= K(V_{dd} - 2V_{data})^2,$$

wherein $V_{GS}$ is a gate-to-source voltage of the driving transistor DTFT and equal to $V_{dd}-(2V_{data}-V_{th})$, and K is a constant relevant to a manufacturing process and a driver design of the driving transistor DTFT.

As can be seen from the above equation, in the embodiments of the present disclosure, the driving signal for the OLED is irrelevant to the threshold voltage $V_{th}$ of the driving transistor DTFT, i.e., the driving current $I_{OLED}$ of the OLED is merely relevant to the second signal $V_{dd}$ and the data signal $V_{data}$. As a result, it is able to eliminate an effect caused by the threshold voltage $V_{th}$ of the driving transistor DTFT on the light-emitting driving signal, and completely prevent the threshold voltage drift of the driving transistor DTFT due to the manufacturing process and a long-term operation, thereby to ensure a normal operation of the OLED. When the second signal $V_{dd}$ is identical to the data signal $V_{data}$ in all pixel units of the OLED display panel, it is able to improve the brightness evenness of the OLED display panel as well as a display effect of the display device.

Figure 3:
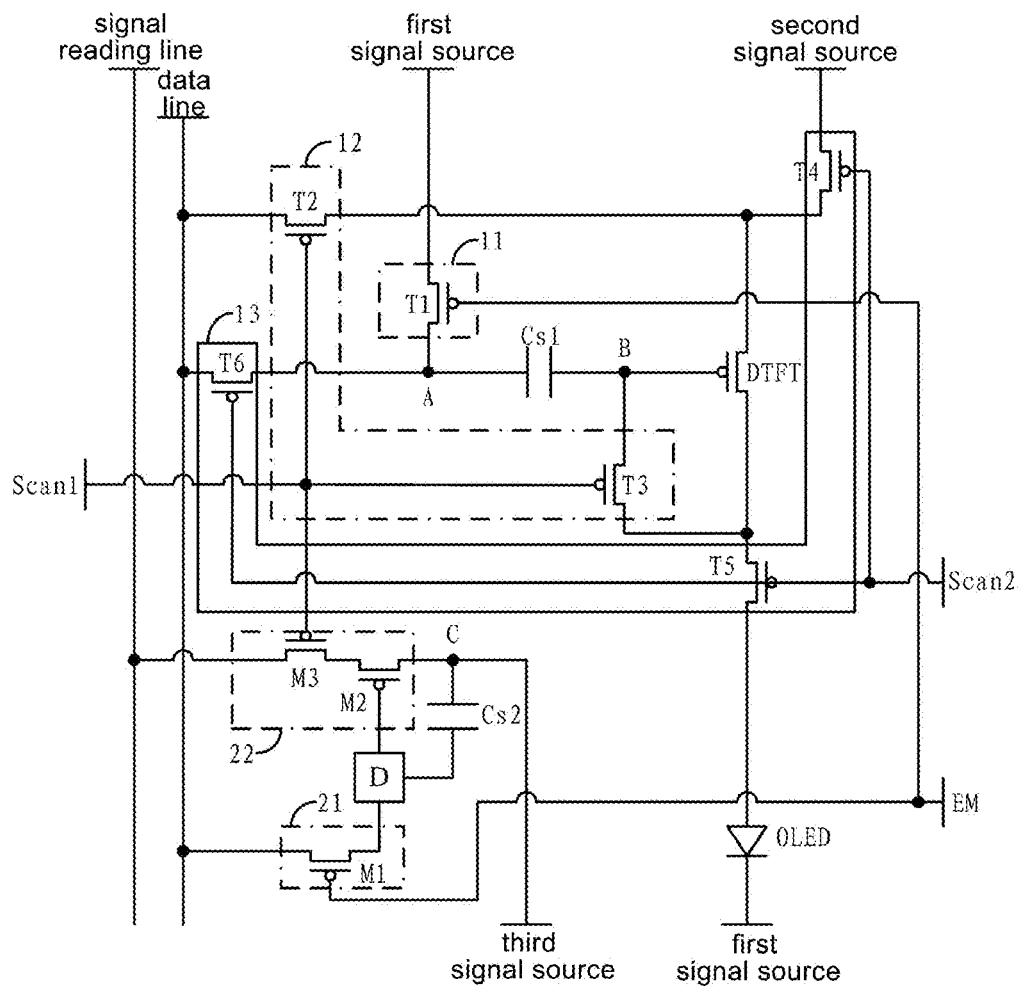
FIG. 3 is a schematic view showing the pixel circuit according to yet another embodiment of the present disclosure.

In a specific embodiment of the present disclosure, as shown in FIG. 3, the resetting unit 11 may include a first thin film transistor T1, a source electrode of which is connected to the first signal source, a gate electrode of which is connected to the control line EM, and a drain electrode of which is connected to the first end (the node A) of the first storage capacitor Cs1.

In a specific embodiment of the present disclosure, as shown in FIG. 3, the first charging unit 12 may include:

a second thin film transistor T2, a source electrode of which is connected to the data line, a gate electrode of which is connected to the first scanning line Scan1, and a drain electrode of which is connected to the source electrode of the driving transistor DTFT; and a third thin film transistor T3, a source electrode of which is connected to the drain electrode of the driving transistor DTFT, a gate electrode of which is connected to the first scanning line Scan1, and a drain electrode of which is connected to the second end (the node B) of the first storage capacitor Cs1.

In a specific embodiment of the present disclosure, as shown in FIG. 3, the compensation driving unit 13 may include:

a fourth thin film transistor T4, a source electrode of which is connected to the second signal source, a gate electrode of which is connected to the second scanning line Scan2, and a drain electrode of which is connected to the source electrode of the driving transistor DTFT;

a fifth thin film transistor T5, a source electrode of which is connected to the drain electrode of the driving transistor DTFT, a gate electrode of which is connected to the second scanning line Scan2, and a drain electrode of which is connected to an anode of the OLED; and a sixth thin film transistor T6, a source electrode of which is connected to the data line, a gate electrode of which is connected to the second scanning line Scan2, and a drain electrode of which is connected to the first end of the first storage capacitor Cs1.

In one embodiment, as shown in FIG. 2, the capacitive touch detection module 2 may include a second storage capacitor Cs2, a second charging unit 21 and a transmitting unit 22. The second charging unit 21 is connected to the data line, the control line EM and a second end (i.e., node D) of the second storage capacitor Cs2, respectively, and configured to, at the first stage of the time period, charge the second storage capacitor Cs2 so that a potential at the second end of the second storage capacitor Cs2 is equal to the potential of the data signal $V_{data}$. The transmitting unit 22 is connected to the third signal source, the second storage capacitor Cs2, the first scanning line Scan1 and the signal reading line (Read Line), respectively, and configured to, at the second stage of the time period, transmit the third signal $V_{CP}$ from the third signal source to the signal reading line when the touch screen is in a touch state, so as to enable a processor (not shown) connected to the signal reading line to determine information about a position where the touch is made.

In a specific embodiment, as shown in FIG. 3, the second charging unit 21 may include a charging transistor M1, a source electrode of which is connected to the data line, a gate electrode of which is connected to the control line EM, and a drain electrode of which is connected to the second end (i.e., the node D) of the second storage capacitor Cs2.

In a specific embodiment, as shown in FIG. 3, the transmitting unit 22 may include an amplifying transistor M2 and a switching transistor M3. A source electrode of the amplifying transistor M2 is connected to a first end (i.e., node C) of the second storage capacitor Cs2 and the third signal source, respectively, a gate electrode thereof is connected to the second end of the second storage capacitor Cs2, and a drain electrode thereof is connected to a source electrode of the switching transistor M3. A gate electrode of the switching transistor M3 is connected to the first scanning line Scan1, and a drain electrode thereof is connected to the signal reading line.

In the embodiments of the present disclosure, the third signal $V_{CP}$ from the third signal source may be a coupling pulse signal.

In the embodiments of the present disclosure, at the first stage, when the charging transistor M1 (i.e., the second charging unit 21) is in an on state, it transmits the data signal $V_{data}$ from the data line to the second end (i.e., the node D) of the second storage capacitor Cs2, so that the potential at the node D is just the potential of the data signal $V_{data}$.

Figure 4:
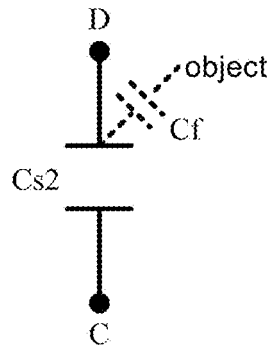
FIG. 4 is a schematic view showing the pixel circuit detecting a touch according to one embodiment of the present disclosure.
Figure 5:
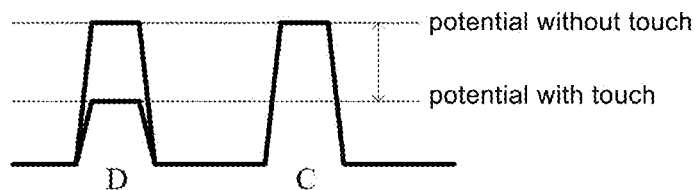
FIG. 5 is a schematic view showing the pixel circuit detecting a touch according to another embodiment of the present disclosure.

In the embodiments of the present disclosure, the node D may be an electrode end of the second storage capacitor Cs2 (e.g., that shown by a box around the node D in FIG. 3). As shown in FIGS. 4 and 5, when the touch screen is touched by an object, e.g., a finger or stylus, a coupling capacitance Cf may be generated between the object and the node D, and thereby the potential at the node D decreases.

It should be appreciated that, at the second stage, the third signal $V_{CP}$ (i.e., the coupling pulse signal), on one hand, is used to apply a voltage to the first end (i.e., the node C) of the second storage capacitor Cs2 so as to enable the potential at the second end (i.e., the node D) of the second storage capacitor Cs2 to $V_{data}+V_{CP}$. On the other hand, it serves as a touch detection signal to be transmitted to the source electrode of the amplifying transistor M2. As a result, when the transmitting unit 22 is in the on state, the third signal $V_{CP}$ may be transmitted to the signal reading line, so as to enable the processor to determine the information about the position where a touch is made.

As shown in FIG. 5, the potential at the gate electrode (i.e., the node D) of the amplifying transistor M2 directly decreases due to the touch. When a gate-to-source voltage of the amplifying transistor M2 is sufficient to enable the amplifying transistor M2 to be in the on state, the amplifying transistor M2 is turned on, so that the third signal $V_{CP}$ passes through the amplifying transistor M2. A procedure where the potential at the node D decreases is just a buffering stage of the capacitive touch detection module 2, and also a procedure of "waiting for" a decrease in the potential at the gate electrode of the amplifying transistor M2. Such a decrease in the potential is mainly caused by the touch operation on the touch screen. When the potential at the node D decreases to an extent sufficient to enable the amplifying transistor M2 to be in the on state, the amplifying transistor M2, as an amplifying TFT, turns on and amplifies the coupling pulse signal.

The third signal $V_{CP}$ is amplified so as to facilitate the collection of the touch signal by the processor.

When a signal (i.e., the third signal $V_{CP}$) is collected by the processor from the signal reading line, a longitudinal (Y-axis) coordinate of the touch position may be determined on the basis of the signal reading line, and an output point of the first scanning line Scan1 is used as a horizontal (X-axis) coordinate of the touch position. After the X-axis and the Y-axis coordinates of the touch position are determined, it is able to determine the information about the position where a touch is made on the touch screen.

In the embodiments of the present disclosure, a touch signal detection circuit of an in-cell touch panel may be integrated into the pixel unit, so as to achieve the detection of the touch operation while achieving the display driving. As a result, it is able to achieve the integration of the pixel driving circuit and the touch signal detection circuit, thereby to further achieve the integration of the display driving and the touch detection in an effective manner. Through such a circuit structure, it is able to achieve the display driving by the in-cell touch panel and the OLED together, thereby to reduce a thickness and a weight of the display panel as well as the cost thereof.

The transistors involved in the above embodiments include the driving transistor DTFT, T1-T6 and M1-M3. These transistors may be P-type transistors, so as to simplify the manufacturing process of the OLED display panel.

The present disclosure further provides in one embodiment a pixel driving method for use in the above-mentioned pixel circuit, which may include the following steps:

within the time period, under the control of the first scanning signal $V_{Scan1}$ from the first scanning line Scan1, the second scanning signal from the second scanning line Scan2 and the control signal $V_{EM}$ from the control line EM, compensating for the threshold voltage $V_{th}$ of the driving transistor DTFT with the data signal $V_{data}$ from the data line and the second signal $V_{dd}$ from the second signal source so that the light-emitting driving signal for the OLED is irrelevant to the threshold voltage $V_{th}$ of the driving transistor at the third stage of the time period; and within the time period, detecting the touch signal from the touch screen under the control of the first scanning signal $V_{Scan1}$ and the control signal $V_{EM}$.

According to the pixel driving method in the embodiment of the present disclosure, it is able to eliminate an effect caused by the threshold voltage $V_{th}$ of the driving transistor DTFT on a light-emitting driving signal, thereby to improve the brightness evenness of the OLED display panel as well as a display effect of the display device. In addition, it is also able to detect a touch while achieving the display driving, thereby to further achieve integration of the display driving and the touch detection in a more effective manner.

Figure 6:
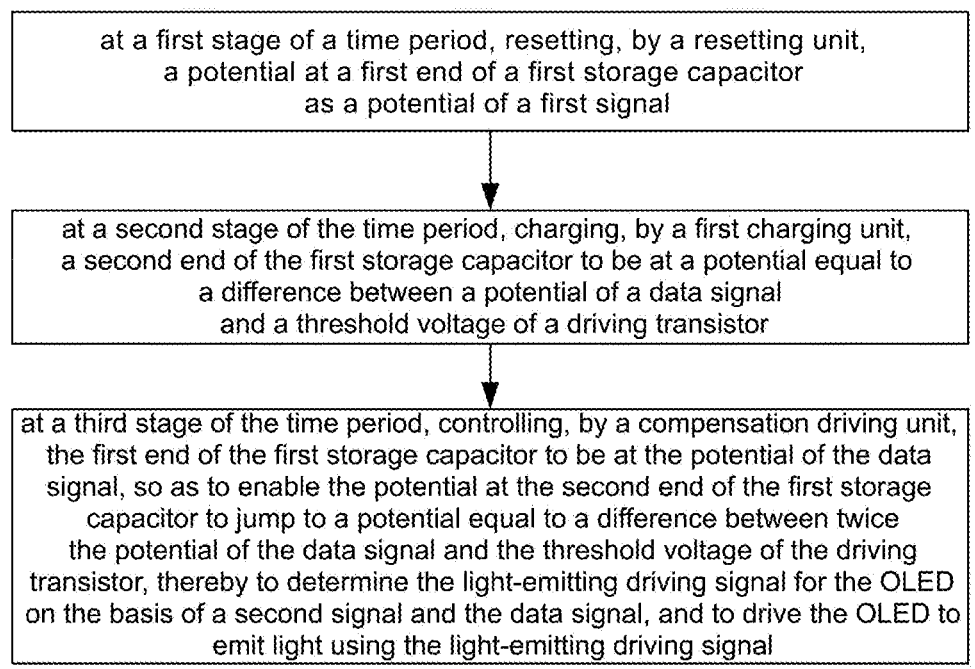
FIG. 6 is a flow chart of a pixel driving method according to one embodiment of the present disclosure.

In one embodiment of the present disclosure, as shown in FIG. 6, the display driving step may include:

at the first stage of the time period, resetting, by the resetting unit 11, the potential at the first end of the first storage capacitor Cs1 as the potential of the first signal;

at the second stage of the time period, charging, by the first charging unit 12, the first storage capacitor Cs1 so that a potential at the second end of the first storage capacitor Cs1 is equal to a difference between the potential of the data signal $V_{data}$ and the threshold voltage $V_{th}$ of the driving transistor DTFT; and at the third stage of the time period, controlling, by the compensation driving unit 13, the first end of the first storage capacitor Cs1 to be at the potential of the data signal $V_{data}$, so as to enable the potential at the second end of the first storage capacitor Cs1 to jump to a potential equal to a difference between twice the potential of the data signal $V_{data}$ and the threshold voltage $V_{th}$ of the driving transistor DTFT, thereby to determine the light-emitting driving signal $I_{OLED}$ for the OLED on the basis of the second signal $V_{dd}$ and the data signal $V_{data}$, and to drive the OLED to emit light using the light-emitting driving signal $I_{OLED}$.

Hence, in the embodiments of the present disclosure, the driving signal for the OLED is irrelevant to the threshold voltage $V_{th}$ of the driving transistor DTFT. As a result, it is able to eliminate an effect caused by the threshold voltage $V_{th}$ of the driving transistor DTFT on the light-emitting driving signal, and improve the brightness evenness of the OLED display panel as well as a display effect of the display device.

Figure 7:
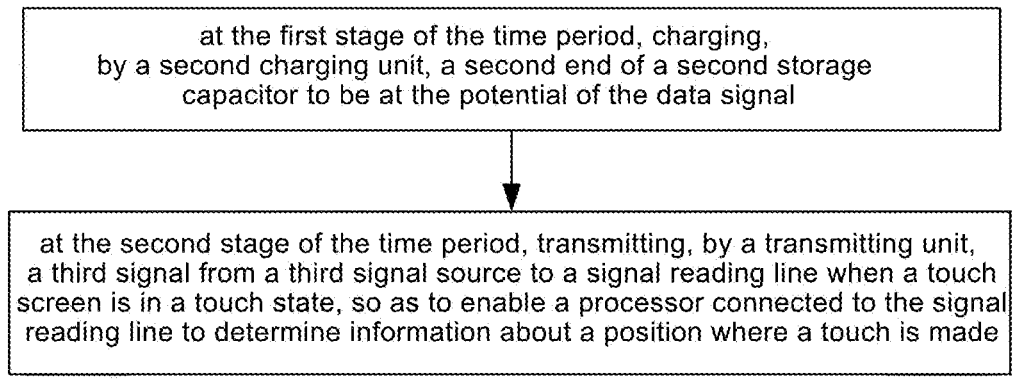
FIG. 7 is a flow chart of the pixel driving method according to another embodiment of the present disclosure.

In one embodiment of the present disclosure, as shown in FIG. 7, the touch detection step may include:

at the first stage of the time period, charging, by the second charging unit 21, the second storage capacitor Cs2 so that the second end of the second storage capacitor Cs2 is at the potential of the data signal $V_{data}$; and at the second stage of the time period, transmitting, by the transmitting unit 22, the third signal $V_{CP}$ from the third signal source to the signal reading line when the touch screen is in a touch state, so as to enable a processor (not shown) connected to the signal reading line to determine the information about the position where a touch is made.

In the embodiments of the present disclosure, a touch signal detection circuit of an in-cell touch panel may be integrated into the pixel unit, so as to achieve the detection of the touch operation while achieving the display driving. As a result, it is able to achieve the integration of the pixel driving circuit and the touch signal detection circuit, thereby to further achieve the integration of the display driving and the touch detection in an effective manner. Through such a circuit structure, it is able to achieve the display driving by the in-cell touch panel and the OLED together, thereby to reduce a thickness and a weight of the display panel as well as the cost thereof.

The following descriptions are given by taking the pixel driving method applied to the pixel circuit in FIG. 3 as an example.

Figure 8:
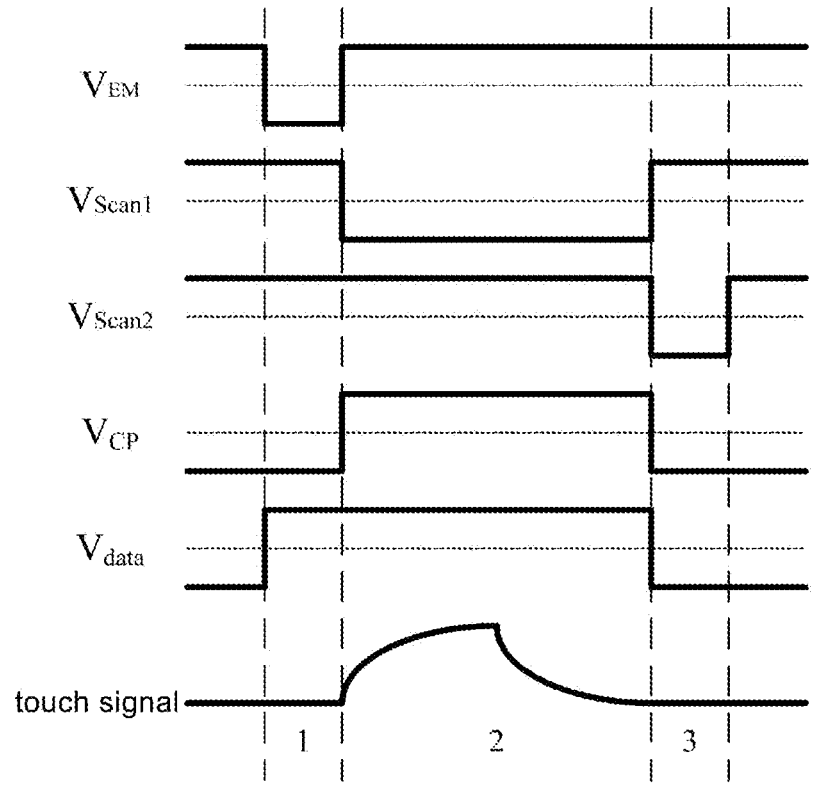
FIG. 8 is a time sequence diagram of signals for use in the pixel driving method according to one embodiment of the present disclosure.

FIG. 8 is a time sequence diagram of the signals, and in this embodiment, the first signal source is the around, i.e., the first signal is a zero potential signal. The pixel driving method may include the following stages.

First Stage

At this stage, the display driving module 1 is at a resetting stage, and the capacitive touch detection module 2 is at a charging stage.

Stage 1 in FIG. 8 shows the inputted signals. The control signal $V_{EM}$ and the third signal $V_{CP}$ are both low level signals, the first scanning signal $V_{Scan1}$, the second scanning signal $V_{Scan2}$ and the data signal $V_{data}$ are high level signals, so the first thin film transistor T1 (i.e., the resetting unit 11) and the charging transistor M1 (i.e., the second charging unit 21) are both in an on state, and the second thin film transistor T2 and the third thin film transistor T3 (i.e., the first charging unit 12, the fourth thin film transistor T4, the fifth thin film transistor T5 and the sixth thin film transistor T6 (i.e., the compensation driving unit 13), and the amplifying transistor M2 and the switching transistor M3 (i.e., the transmitting unit 22) are in an off state.

Figure 9:
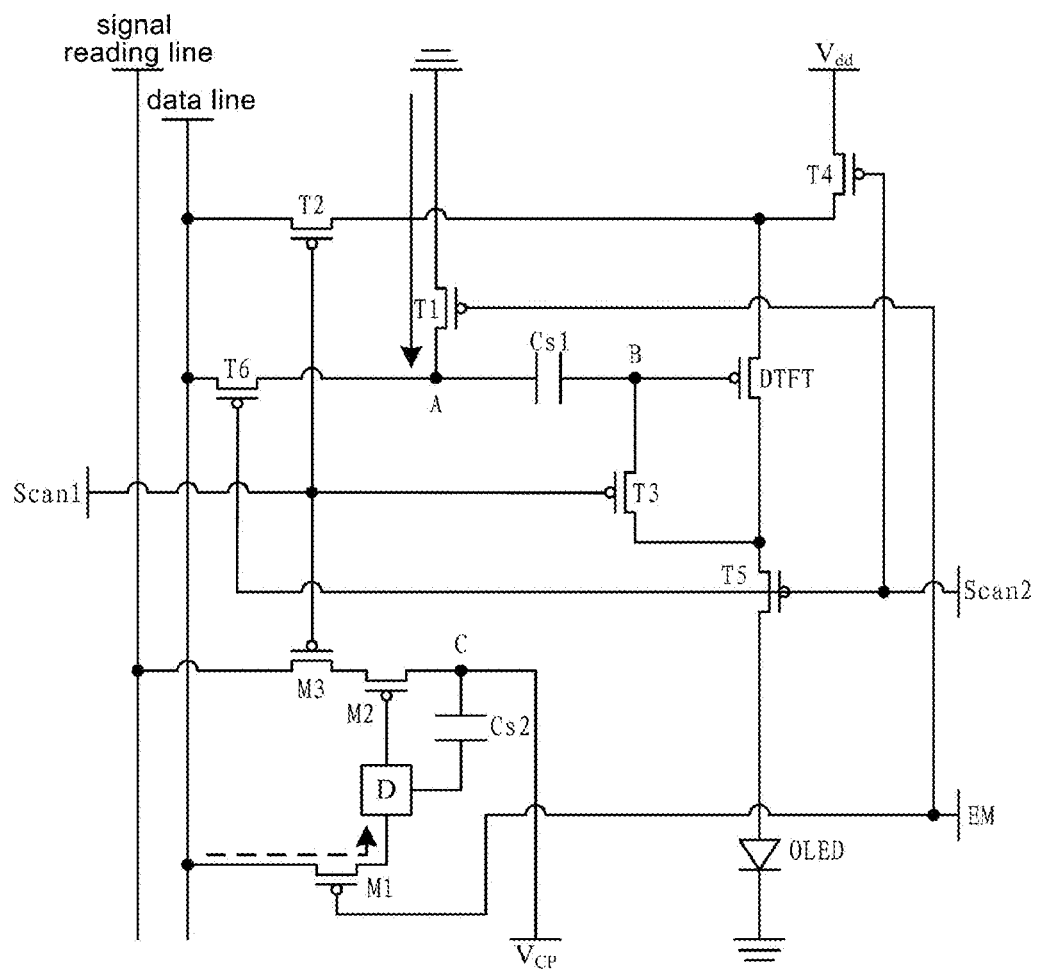
FIG. 9 is a schematic view showing the pixel circuit at a first stage according to one embodiment of the present disclosure.

At this stage, as shown by the solid arrow in FIG. 9, the first thin film transistor T1 is in the on state, so the first signal from the first signal source is transmitted to the first end (i.e., the node A) of the first storage capacitor Cs1. The first signal is the zero potential signal, so the first storage capacitor Cs1 is discharged so that the potential at the first end (i.e., the node A) of the first storage capacitor Cs1 is zero, i.e., $V_{A1}=0$. As a result, it is able to eliminate an effect caused by a residual voltage signal of the first storage capacitor Cs1 within a previous time period on that in a current time period, thereby to reset the potential $V_{A1}$ at the node A at the first stage.

As shown by the dotted arrow in FIG. 9, the charging transistor M1 is in the on state, so the data signal $V_{data}$ from the data line is transmitted to the second end (i.e., the node D) of the second storage capacitor Cs2, so as to charge the node D to be at potential of the data signal $V_{data}$.

At this stage, the data signal $V_{data}$ is a high level signal, so the P-type amplifying transistor M2 is in the off state.

At this stage, as shown in FIG. 8, there is no signal in the signal reading line.

Second Stage

At this stage, the display driving module 1 is at a charging stage, and the capacitive touch detection module 2 is at a touch signal amplifying and collecting stage.

Stage 2 in FIG. 8 shows the inputted signals. The first scanning signal $V_{Scan1}$ is a low level signal, the control signal $V_{EM}$, the second scanning signal $V_{Scan2}$, the third signal $V_{CP}$ and the data signal $V_{data}$ are high level signals, so the second thin film transistor T2 and the third thin film transistor T3 (i.e., the first charging unit 12), and the switching transistor M3 are in the on state, and the first thin film transistor T1 (i.e., the resetting unit 11), the fourth thin film transistor T4, the fifth thin film transistor T5 and the sixth thin film transistor T6 (i.e., the compensation driving unit 13), and the charging transistor M1 (i.e., the second charging unit 21) are in the off state.

Figure 10:
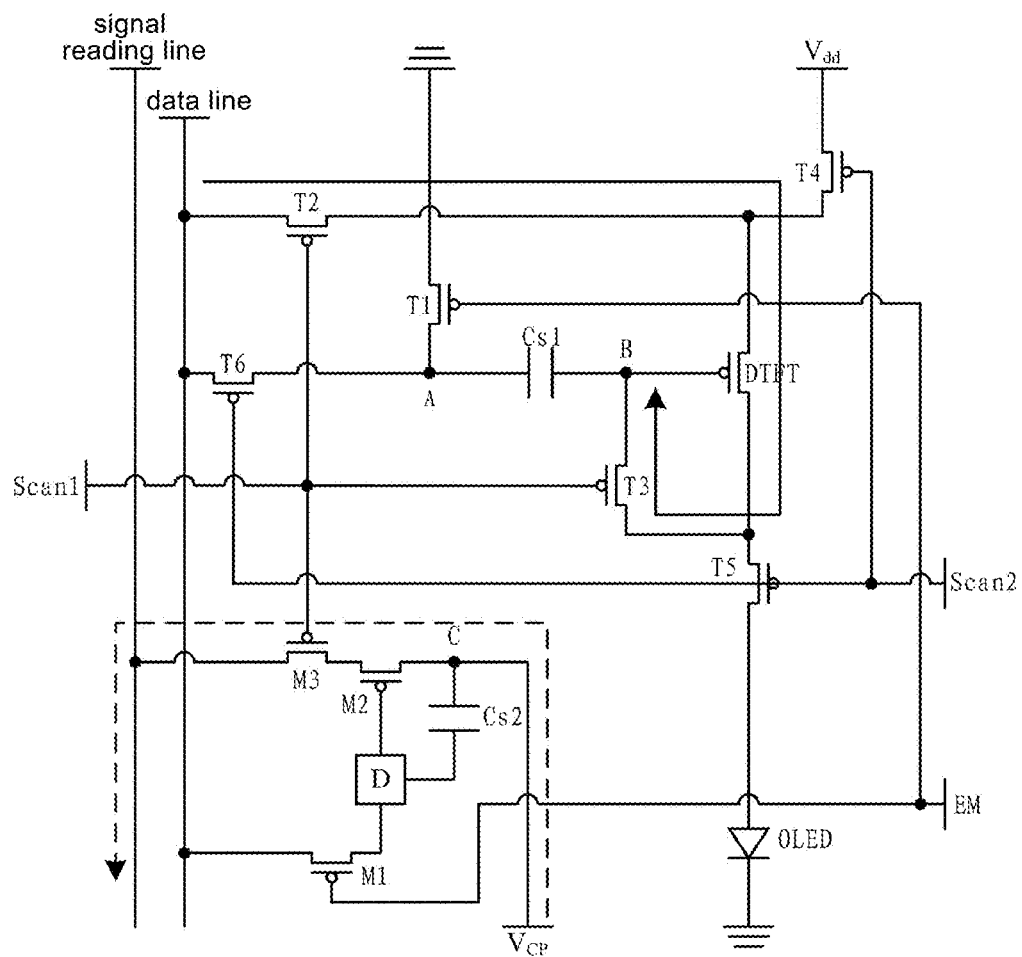
FIG. 10 is a schematic view showing the pixel circuit at a second stage according to one embodiment of the present disclosure.

At this stage, as shown by the solid arrow in FIG. 10, the second thin film transistor T2 and the third thin film transistor T3 are in the on state, so the data signal $V_{data}$ is transmitted sequentially through the second thin film transistor T2, the driving transistor DTFT and the third thin film transistor T3, so as to charge the first storage capacitor Cs1 so that the second end (i.e., the node B) of the first storage capacitor Cs1 is equal to a difference $V_{B2}$ between the potential of the data signal $V_{data}$ and the threshold voltage $V_{th}$ of the driving transistor DTFT, i.e., $V_{B2}=V_{data}-V_{th}$.

At the second stage, the potential at the node A is always zero, i.e., $V_{A2}=0$, so after the charging, the potential at the node B is maintained at $V_{data}-V_{th}$ all the time, and at this time, a voltage difference between two ends of the first storage capacitor Cs1 is $V_{data}-V_{th}$.

In addition, at this stage, the fifth thin film transistor T5 is always in the off state, so it is able to prevent the current from passing through the OLED, thereby to prolong a service life of the OLED.

When a touch is made at this stage, as shown in FIG. 5, the potential at the gate electrode (i.e., the node D) of the amplifying transistor M2 directly decreases due to the touch. When the gate-to-source voltage of the amplifying transistor M2 is sufficient to enable it to be in the on state, the amplifying transistor M2 is in the on state. Meanwhile, due to the control of the first scanning signal $V_{Scan1}$, the switching transistor M3 is in the on state at this stage. As shown by the dotted arrow in FIG. 10, the third signal $V_{CP}$ at a high level is transmitted by the transmitting unit 22 to the signal read line (as shown in FIG. 8, there is a signal in the signal reading line), so as to be collected by the processor arranged at a rear end of the signal reading line.

When the signal (i.e., the third signal $V_{CP}$) from the signal reading line is collected by the processor, a longitudinal (Y-axis) coordinate of the touch position may be determined on the basis of the signal reading line, and an output point of the first scanning line Scan1 is used as a horizontal (X-axis) coordinate of the touch position. After the X-axis and the Y-axis coordinates of the touch position are determined, it is able to determine the information about the position where a touch is made on the touch screen.

Third Stage

At this stage, the display driving module 1 is at a complementary light-emitting stage, and the capacitive touch detection module 2 is at a stagnation stage.

Stage 3 in FIG. 8 shows the inputted signals at this stage. The second scanning signal $V_{Scan2}$, the third signal $V_{CP}$ and the data signal $V_{data}$ are low level signals, the first scanning signal $V_{Scan1}$ and the control signal $V_{EM}$ are both high level signals, so the fourth thin film transistor T4, the fifth thin film transistor T5 and the sixth thin film transistor T6 (i.e., the compensation driving unit 13) are in the on state, and the first thin film transistor T1 (i.e., the resetting unit 11), the second thin film transistor T2 and the third thin film transistor T3 (i.e., the first charging unit 12, the charging transistor M1 (i.e., the second charging unit 21) and the switching transistor M3 are in the off state.

Figure 11:
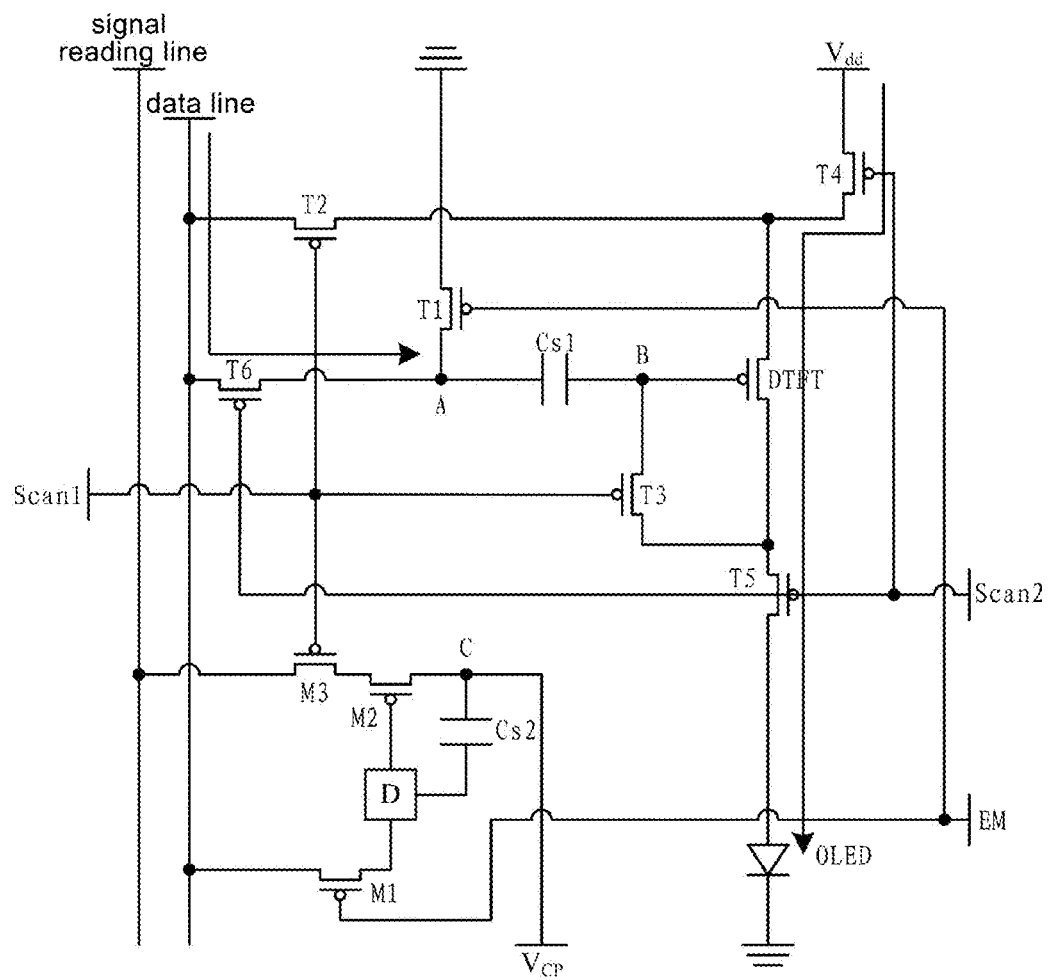
FIG. 11 is a schematic view showing the pixel circuit at a third stage according to one embodiment of the present disclosure.

At this stage, as shown by the solid arrow in FIG. 11, the sixth thin film transistor T6 is in the on state, so the data signal $V_{data}$ is transmitted through the sixth thin film transistor T6, so as to charge the first storage capacitor Cs1 so that the potential of the first end (i.e., the node A) of the first storage capacitor Cs1 is changed from a zero potential to the potential of the data signal $V_{data}$, i.e., $V_{A3}=V_{data}$.

The third thin film transistor T3 is in the off state, so the node B is in a floating state. In order to maintain the voltage difference between two ends of the first storage capacitor Cs1 at $V_{data}-V_{th}$, when the potential at the node A reaches the data signal $V_{data}$, an equal-voltage jump occurs for the potential at the node B, i.e., at the gate electrode of the driving transistor, and the potential $V_{B3}$ at the node B is enabled to jump to $2V_{data}-V_{th}$.

In addition, the fourth thin film transistor T4 and the sixth thin film transistor T6 are both in the on state, so at the third stage, the second signal $V_{dd}$ is transmitted to the source electrode of the driving transistor DTFT through the fourth thin film transistor T4, and a current passes through the sixth thin film transistor T6 and reaches the anode of the OLED, so as to drive the OLED to emit light.

The following equation may be obtained according to a saturation current formula of the driving transistor DTFT:

$$I_{OLED} = K(V_{GS} - V_{th})^2$$
$$= K[V_{dd} - (2V_{data} - V_{th}) - V_{th}]^2$$
$$= K(V_{dd} - 2V_{data})^2$$

wherein $V_{GS}$ is the gate-to-source voltage of the driving transistor DTFT and equal to $V_{dd}-(2V_{data}-V_{th})$, and K is a constant relevant to a manufacturing process and a driver design of the driving transistor DTFT.

As can be seen from the above equation, in the embodiments of the present disclosure, the driving signal for the OLED is irrelevant to the threshold voltage $V_{th}$ of the driving transistor DTFT, i.e., the driving current $I_{OLED}$ of the OLED is merely relevant to the second signal $V_{dd}$ and the data signal $V_{data}$. As a result, it is able to eliminate an effect caused by the threshold voltage $V_{th}$ of the driving transistor DTFT on the light-emitting driving signal, and completely prevent the threshold voltage drift of the driving transistor DTFT due to the manufacturing process and a long-term operation, thereby to ensure a normal operation of the OLED.

At the third stage, the charging transistor M1, the amplifying transistor M2 and the switching transistor M3 in the capacitive touch detection module 2 are in the off state, i.e., they do not work, and at this time, it is just the stage where the OLED is driven by the display driving module 1 to emit light. As a result, it is able to reduce the effect of the touch detection on the display driving.

According to the pixel driving method in the embodiments of the present disclosure, it is able to eliminate an effect caused by the threshold voltage $V_{th}$ of the driving transistor DTFT on a light-emitting driving signal, thereby to improve the brightness evenness of the OLED display panel as well as a display effect of the display device. In addition, it is also able to detect a touch while achieving the display driving, thereby to further achieve integration of the display driving and the touch detection in a more effective manner.

The present disclosure further provides in one embodiment an OLED display panel including the above-mentioned pixel circuit.

The present disclosure further provides in one embodiment a display device including the above-mentioned OLED display panel. The display device may be a liquid crystal panel, a liquid crystal TV, a liquid crystal display, an OLED panel, an OLED display, a plasma display or an electronic paper.

The pixel circuit, the OLED display panel and the display device in the embodiments of the present disclosure are particularly applicable to a gate driver on array (GOA) circuit manufactured by a low temperature polysilicon (LTPS) technology. Of course, it may also be applicable to the GOA circuit manufactured by an a-Si technology.

According to the pixel circuit, its driving method, the OLED display panel and the OLED display device in the embodiments of the present disclosure, the pixel circuit includes the display driving module which is connected to the first scanning line, the second scanning line, the control line, the data line, the first signal source and the second signal source, respectively, and configured to, within the time period and under the control of the first scanning signal from the first scanning line, the second scanning signal from the second scanning line and the control signal from the control line, compensate for the threshold voltage of the driving transistor with the data signal from the data line and the second signal from the second signal source, so that the light-emitting driving signal for the OLED is irrelevant to the threshold voltage of the driving transistor at the third stage of the time period; and the capacitive touch detection module which is connected to the first scanning line, the control line, the data line, the third signal source and the signal reading line, respectively, and configured to, within the time period and under the control of the first scanning signal and the control signal, detect the touch signal from the touch screen.

According to the embodiments of the present disclosure, the driving signal for the OLED is irrelevant to the threshold voltage $V_{th}$ of the driving transistor DTFT. As a result, it is able to eliminate an effect caused by the threshold voltage $V_{th}$ of the driving transistor DTFT on the light-emitting driving signal, thereby to improve the brightness evenness of the OLED display panel as well as a display effect of the display device.

In the embodiments of the present disclosure, a touch signal detection circuit of an in-cell touch panel may be integrated into the pixel unit, so as to achieve the detection of the touch operation while achieving the display driving. As a result, it is able to achieve the integration of the pixel driving circuit and the touch signal detection circuit, thereby to further achieve the integration of the display driving and the touch detection in an effective manner. Through such a circuit structure, it is able to achieve the display driving by the in-cell touch panel and the OLED together, thereby to reduce a thickness and a weight of the display panel as well as the cost thereof.

In addition, according to the embodiments of the present disclosure, it is able to prevent the current from passing through the OLED for a long period of time, thereby to prolong the service life of the OLED.

Further, according to the embodiments of the present disclosure, when the OLED is driven by the display driving module 1 to emit light, the photosensitive touch detection module 2 is in the stagnation state. As a result, it is able to reduce an effect of the touch detection on the display driving, thereby to achieve the integration of the display driving and the touch detection in an effective manner.

It should be appreciated that, the pixel circuit in the embodiments of the present disclosure may be applicable to the thin film transistors manufactured by a-Si, poly-Si or oxide. In addition, although the description is given hereinabove by taking the P-type thin film transistor as an example, the N-type thin film transistors or CMOS transistors may also be used. Further, although the AMOLED is mentioned in the above embodiments, the present disclosure is not limited thereto, and it may also be applicable to the other LED display devices.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A pixel circuit, comprising a first storage capacitor, a driving transistor and an organic light-emitting diode (OLED), a gate electrode of the driving transistor being connected to a second end of the first storage capacitor, wherein the pixel circuit further comprises:
   a display driving module, connected to a first scanning line, a second scanning line, a control line, a data line, a first signal source and a second signal source, respectively, and configured to, within a time period and under the control of a first scanning signal from the first scanning line, a second scanning signal from the second scanning line and a control signal from the control line, compensate for a threshold voltage of the driving transistor with a data signal from the data line and a second signal from the second signal source, so that a light-emitting driving signal for the OLED is irrelevant to the threshold voltage of the driving transistor at a third stage of the time period; and
   a capacitive touch detection module, connected to the first scanning line, the control line, the data line, a third signal source and a signal reading line, respectively, and configured to, within the time period and under the control of the first scanning signal and the control signal, detect a touch signal from a touch screen.

2. The pixel circuit according to claim 1, wherein the display driving module comprises:
   a resetting unit, connected to the first signal source, the control line and a first end of the first storage capacitor, respectively, and configured to, at a first stage of the time period, reset a potential at the first end of the first storage capacitor as a potential of a first signal;
   a first charging unit, connected to the first scanning line, the data line, the driving transistor and the second end of the first storage capacitor, respectively, and configured to, at a second stage of the time period, charge the first storage capacitor so that the second end of the first storage capacitor is at a potential equal to a difference between a potential of a data signal and the threshold voltage of the driving transistor; and
   a compensation driving unit, connected to the second scanning line, the data line, the second signal source, the first end of the storage capacitor and the driving transistor, respectively, and configured to, at the third stage of the time period, control the first end of the first storage capacitor to be at the potential of the data signal, so as to enable the potential at the second end of the first storage capacitor to jump to a potential equal to a difference between twice the potential of the data signal and the threshold voltage of the driving transistor, thereby to determine the light-emitting driving signal for the OLED on the basis of the second signal and the data signal, and to drive the OLED to emit light using the light-emitting driving signal.

3. The pixel circuit according to claim 2, wherein the resetting unit comprises a first thin film transistor, a source electrode of which is connected to the first signal source, a gate electrode of which is connected to the control line, and a drain electrode of which is connected to the first end of the first storage capacitor.

4. The pixel circuit according to claim 2, wherein the first charging unit comprises:
   a second thin film transistor, a source electrode of which is connected to the data line, a gate electrode of which is connected to the first scanning line, and a drain electrode of which is connected to a source electrode of the driving transistor; and
   a third thin film transistor, a source electrode of which is connected to a drain electrode of the driving transistor, a gate electrode of which is connected to the first scanning line, and a drain electrode of which is connected to the second end of the first storage capacitor.

5. The pixel circuit according to claim 2, wherein the compensation driving unit comprises:
   a fourth thin film transistor, a source electrode of which is connected to the second signal source, a gate electrode of which is connected to the second scanning line, and a drain electrode of which is connected to the source electrode of the driving transistor;
   a fifth thin film transistor, a source electrode of which is connected to the drain electrode of the driving transistor, a gate electrode of which is connected to the second scanning line, and a drain electrode of which is connected to an anode of the OLED; and
   a sixth thin film transistor, a source electrode of which is connected to the data line, a gate electrode of which is connected to the second scanning line, and a drain electrode of which is connected to the first end of the first storage capacitor.

6. The pixel circuit according to claim 1, wherein the capacitive touch detection module comprises a second storage capacitor, a second charging unit and a transmitting unit;
   the second charging unit is connected to the data line, the control line and a second end of the second storage capacitor, respectively, and configured to, at the first stage of the time period, charge the second storage capacitor so that a potential at the second end of the second storage capacitor is equal to the potential of the data signal; and
   the transmitting unit is connected to the third signal source, the second storage capacitor, the first scanning line and the signal reading line, respectively, and configured to, at the second stage of the time period, transmit a third signal from the third signal source to the signal reading line when the touch screen is in a touch state, so as to enable a processor connected to the signal reading line to determine information about a position where the touch is made.

7. The pixel circuit according to claim 6, wherein the second charging unit comprises a charging transistor, a source electrode of which is connected to the data line, a gate electrode of which is connected to the control line, and a drain electrode of which is connected to the second end of the second storage capacitor.

8. The pixel circuit according to claim 6, wherein the transmitting unit comprises an amplifying transistor and a switching transistor;
a source electrode of the amplifying transistor is connected to a first end of the second storage capacitor and the third signal source, respectively, a gate electrode thereof is connected to the second end of the second storage capacitor, and a drain electrode thereof is connected to a source electrode of the switching transistor; and
a gate electrode of the switching transistor is connected to the first scanning line, and a drain electrode thereof is connected to the signal reading line.

9. The pixel circuit according to claim 2, wherein the transistors are P-type transistors, the first signal is a low level signal or a zero potential signal, and the second signal is a high level signal.

10. A pixel driving method for use in the pixel circuit according to claim 1, comprising steps of:
within a time period, under the control of a first scanning signal from a first scanning line, a second scanning signal from a second scanning line and a control signal from a control line, compensating for a threshold voltage of a driving transistor with a data signal from a data line and a second signal from a second signal source so that a light-emitting driving signal for an OLED is irrelevant to the threshold voltage of the driving transistor at a third stage of the time period; and
within the time period, detecting a touch signal from a touch screen under the control of the first scanning signal and the control signal.

11. The method according to claim 10, wherein the step of within a time period, under the control of the first scanning signal from the first scanning line, the second scanning signal from the second scanning line and the control signal from the control line, compensating for the threshold voltage of the driving transistor with the data signal from the data line and the second signal from the second signal source so that the light-emitting driving signal for the OLED is irrelevant to the threshold voltage of the driving transistor at the third stage of the time period comprises:
at a first stage of the time period, resetting, by a resetting unit, a potential at a first end of a first storage capacitor as a potential of a first signal;
at a second stage of the time period, charging, by a first charging unit, the first storage capacitor so that a second end of the first storage capacitor is at a potential equal to a difference between a potential of a data signal and the threshold voltage of the driving transistor; and
at the third stage of the time period, controlling, by a compensation driving unit, the first end of the first storage capacitor to be at the potential of the data signal, so as to enable the potential at the second end of the first storage capacitor to jump to a potential equal to a difference between twice the potential of the data signal and the threshold voltage of the driving transistor, thereby to determine the light-emitting driving signal for the OLED on the basis of the second signal and the data signal, and to drive the OLED to emit light using the light-emitting driving signal.

12. The method according to claim 10, wherein the step of within the time period, detecting a touch signal from a touch screen under the control of the first scanning signal and the control signal comprises:
at the first stage of the time period, charging, by a second charging unit, a second storage capacitor so that a second end of a second storage capacitor is at the potential of the data signal; and
at the second stage of the time period, transmitting, by a transmitting unit, a third signal from a third signal source to a signal reading line when a touch screen is in a touch state, so as to enable a processor connected to the signal reading line to determine information about a position where a touch is made.

13. The method according to claim 11, wherein at the first stage, the control signal and the third signal are both low level signals, and the first scanning signal, the second scanning signal and the data signal are high level signals;
at the second stage, the first scanning signal is a low level signal, and the control signal, the second scanning signal, the third signal and the data signal are high level signals; and
at the third stage, the second scanning signal, the third signal and the data signal are low level signals, and the control signal and the first scanning signal are both high level signals.

14. An OLED display panel comprising the pixel circuit according to claim 1.

15. A display device comprising the OLED display panel according to claim 14.

16. The pixel circuit according to claim 2, wherein the capacitive touch detection module comprises a second storage capacitor, a second charging unit and a transmitting unit;
the second charging unit is connected to the data line, the control line and a second end of the second storage capacitor, respectively, and configured to, at the first stage of the time period, charge the second storage capacitor so that a potential at the second end of the second storage capacitor is equal to the potential of the data signal; and
the transmitting unit is connected to the third signal source, the second storage capacitor, the first scanning line and the signal reading line, respectively, and configured to, at the second stage of the time period, transmit a third signal from the third signal source to the signal reading line when the touch screen is in a touch state, so as to enable a processor connected to the signal reading line to determine information about a position where the touch is made.

17. The pixel circuit according to claim 16, wherein the transistors are P-type transistors, the first signal is a low level signal or a zero potential signal, the second signal is a high level signal, and the third signal is a coupling pulse signal.

18. The method according to claim 12, wherein at the first stage, the control signal and the third signal are both low level signals, and the first scanning signal, the second scanning signal and the data signal are high level signals;
at the second stage, the first scanning signal is a low level signal, and the control signal, the second scanning signal, the third signal and the data signal are high level signals; and
at the third stage, the second scanning signal, the third signal and the data signal are low level signals, and the control signal and the first scanning signal are both high level signals.

* * * * *